United States Patent
Yan et al.

(10) Patent No.: US 9,882,645 B2
(45) Date of Patent: Jan. 30, 2018

(54) SERVICE SENDING, RECEIVING METHODS AND DEVICES

(71) Applicant: ZTE CORPORATION, Shenzhen, Guangdong Province (CN)

(72) Inventors: Fen Yan, Shenzhen (CN); Xiaoping Tu, Shenzhen (CN); Huilong Xia, Shenzhen (CN)

(73) Assignee: XI'AN ZHONGXING NEW SOFTWARE CO. LTD., Xi'An (CN)

( * ) Notice: Subject to any disclaimer, the term of this patent is extended or adjusted under 35 U.S.C. 154(b) by 1 day.

(21) Appl. No.: 15/021,769

(22) PCT Filed: Jun. 16, 2014

(86) PCT No.: PCT/CN2014/079997
§ 371 (c)(1),
(2) Date: Mar. 14, 2016

(87) PCT Pub. No.: WO2014/187426
PCT Pub. Date: Nov. 27, 2014

(65) Prior Publication Data
US 2016/0226589 A1  Aug. 4, 2016

(30) Foreign Application Priority Data
Sep. 13, 2013 (CN) .......................... 2013 1 0418986

(51) Int. Cl.
*H04B 10/27* (2013.01)
*H04Q 11/00* (2006.01)
*H04L 12/861* (2013.01)

(52) U.S. Cl.
CPC ......... *H04B 10/27* (2013.01); *H04Q 11/0066* (2013.01); *H04L 49/9057* (2013.01)

(58) Field of Classification Search
CPC ..... H04B 10/27; H04L 45/74; H04L 12/4645; H04L 12/4633
(Continued)

(56) References Cited

U.S. PATENT DOCUMENTS 5,959,990 A * 9/1999 Frantz ................. H04L 12/4645
370/392
6,999,479 B1  2/2006 Jha
(Continued)

FOREIGN PATENT DOCUMENTS

| CN | 101193050 A | 6/2008 |
|---|---|---|
| CN | 101895367 | 11/2010 |
| CN | 101959083 A | 1/2011 |
| EP | 1619834 | 1/2006 |

OTHER PUBLICATIONS

ProQuest Dialog English Translation of CN 101959083. Cao et al; Published Jan. 26, 2011. 34 pages.*
International Search Report (Form PCT/ISA/210) for International Application No. PCT/CN2014/079997 dated Sep. 1, 2014.
Supplementary European Search Report, Application No. EP 14 80 1665, date completed Aug. 8, 2016.

*Primary Examiner* — Don N Vo
(74) *Attorney, Agent, or Firm* — Koppel, Patrick, Heybl & Philpott

(57) ABSTRACT

Provided are service sending, receiving methods and devices. The service sending method includes that: one or more services are sequentially mapped into a target transmission frame; the target transmission frame is encapsulated into Optical Burst Units (OBUs), which carry one or more Transmission Adapter Units (TAUs), according to a sequence of mapping, wherein the one or more TAUs carried in the N OBUs are able to be formed into the target transmission frame, and each TAU carries a data fragment of the one or more services; N is a positive integer; an Identifier (Continued)

(ID) for indicating an identity of the target transmission frame is added into an overhead of each TAU; a length indicator for indicating the length of payload, occupied by the TAU, in an OBU is added into the overhead of each TAU; a position identifier for indicating a position of the TAU in the target transmission frame is added into the overhead of each TAU; and the N OBUs are sent to a destination node one by one according to a sequence of encapsulating. According to the solution, service transmission can be performed in an Optical Burst Transport Network (OBTN).

8 Claims, 4 Drawing Sheets

(58) Field of Classification Search
USPC .......................................................... 398/58
See application file for complete search history.

(56) References Cited

U.S. PATENT DOCUMENTS

| | | | |
|---|---|---|---|
| 8,825,900 B1 * | 9/2014 | Gross, IV | H04L 47/31 |
| | | | 709/238 |
| 2008/0043737 A1 * | 2/2008 | George | H04L 69/32 |
| | | | 370/392 |
| 2013/0145152 A1 * | 6/2013 | Maino | H04L 63/0428 |
| | | | 713/156 |

* cited by examiner

SERVICE SENDING, RECEIVING METHODS AND DEVICES

TECHNICAL FIELD

The present disclosure relates to the field of communications, and provides a service sending method and device, and a service receiving method and device.

BACKGROUND

In an Optical Burst Transport Network (OBTN), a client service is encapsulated into an Optical Burst Unit (OBU) at a source node first, and then sent through an optical channel; after receiving the OBU, a destination node decapsulates the OBU to obtain the client service. In consideration of requirements in various aspects, such as rate adaptation, scheduling granularity and compatibility and so on, a common practice is to add a layer of Transmission Adapter Units (TAUs) between a client service layer and an OBU layer, and the client service is mapped to a transmission frame first, and then encapsulated and adapted into an OBU through a TAU.

Since the length of the transmission frame is determined by the service, a plurality of transmission frames may be encapsulated in one OBU, or one transmission frame is encapsulated in a plurality of OBUs. Therefore, how to completely and accurately obtain the transmission frame from one or more OBUs through parsing remains to be a technical problem to be solved.

SUMMARY

The embodiments of the present disclosure provide a service sending method and device, and a service receiving method and device, so as to implement service transmission in an OBTN.

An embodiment of the present disclosure provides a service sending method applied to a source node so as to solve the technical problem above, the method including that:

one or more services are sequentially mapped into a target transmission frame;

the target transmission frame is encapsulated into N OBUs, which carry one or more TAUs, according to a sequence of mapping, wherein the one or more TAUs carried in the N OBUs are able to be formed into the target transmission frame, and each TAU carries a data fragment of the one or more services; and N is a positive integer;

an Identifier (ID) for indicating an identity of the target transmission frame is added into an overhead of each TAU, to enable a destination node to determine, according to the ID, the target transmission frame to which the TAU belongs;

a length indicator for indicating the length of payload, occupied by the TAU, in an OBU is added into the overhead of each TAU, to enable the destination node to acquire the TAU from the OBU through decapsulation according to the length indicator;

a position identifier for indicating a position of the TAU in the target transmission frame is added into the overhead of each TAU, to enable the destination node to determine, according to the position indicator and the ID, a progress of receiving the one or more services in the target transmission frame by the destination node, when the destination node parses the data fragment in the current TAU; and the N OBUs are sent to the destination node one by one according to a sequence of encapsulating.

In the method, each OBU may carry one TAU in the target transmission frame;

adding one position indicator into the overhead of each TAU may include that:

when N>1, a first position indictor is added into overheads of the first N−1 TAUs, and a second position indictor is added into the overhead of the $N^{th}$ TAU; when N=1, the second position indicator is added into the overhead of the TAU, to enable the destination node to determine, according to the first position indictor and the ID, that there are one or more other TAUs to be parsed in the target transmission frame, and determine, according to the second position indictor and the ID, that all of the one or more TAUs in the target transmission frame have been parsed.

Another embodiment of the present disclosure further provides a service receiving method, applied to a destination node and including that:

N OBUs, which carry one or more TAUs, are received sequentially from a source node, wherein the one or more TAUs carried in the N OBUs are able to be formed into a target transmission frame into which one or more services are mapped, and each TAU carries a data fragment of the one or more services; N is a positive integer; and an overhead of each TAU includes: an ID for indicating an identity of the target transmission frame, a length indicator for indicating the length of payload, occupied by the TAU, in an OBU, and a position indicator for indicating a position of the TAU in the target transmission frame;

the following operations are executed on the N OBUs one by one according to a sequence of receiving:

obtaining one or more TAUs from a current OBU sequentially through parsing according to the length indicator in the overhead of each TAU;

storing, one by one according to a sequence of parsing, each data fragment carried by the one or more TAUs, wherein if it is determined, according to the position indicator and the ID in the overhead of a certain TAU, that the TAU is the last TAU in the target transmission frame, it is determined that the one or more services in the target transmission frame have been completely received.

In the method, storing, one by one according to the sequence of parsing, each data fragment carried by the one or more TAUs may include that:

a cache space is designated according to the ID in the overhead of the one or more TAUs, and each data fragment carried by the one or more TAUs is stored in the cache space according to the sequence of parsing.

Another embodiment of the present disclosure further provides a service sending device, applied to a source node and including:

a mapping component, configured to sequentially map one or more services into a target transmission frame;

an encapsulating component, configured to encapsulate the target transmission frame into N OBUs, which carry one or more TAUs, according to a sequence of mapping, wherein the one or more TAUs carried in the N OBUs are able to be formed into the target transmission frame, and each TAU carries a data fragment of the one or more services; and N is a positive integer;

a first adding component, configured to add an ID for indicating an identity of the target transmission frame into an overhead of each TAU, to enable a destination node to determine, according to the ID, the target transmission frame to which the TAU belongs;

a second adding component, configured to add a length indicator for indicating the length of payload, occupied by the TAU, in an OBU into the overhead of each TAU, to enable the destination node to acquire the TAU from the OBU through decapsulation according to the length indicator;

a third adding component, configured to add a position indicator for indicating a position of the TAU in the target transmission frame into the overhead of each TAU, to enable the destination node to determine, according to the position indicator and the ID, a progress of receiving the one or more services in the target transmission frame by the destination node, when the destination node parses the data fragment in the current TAU; and a sending component, configured to send the N OBUs to the destination node one by one according to a sequence of encapsulating.

In the device, each OBU may carry one TAU in the target transmission frame;

the third adding component may be configured to:

when N>1, add a first position indictor into overheads of the first N−1 TAUs, and add a second position indictor into the overhead of the $N^{th}$ TAU; when N=1, add the second position indicator into the overhead of the TAU, to enable the destination node to determine, according to the first position indictor and the ID, that there are one or more other TAUs to be parsed in the target transmission frame, and determine, according to the second position indictor and the ID, that all of the one or more TAUs in the target transmission frame have been parsed.

Still another embodiment of the present disclosure further provides a service receiving device, applied to a destination node and including:

a receiving component, configured to sequentially receive, from a source node, N Optical Burst Units (OBUs), which carry N Transmission Adapter Units (TAUs), wherein the N TAUs carried in the N OBUs are able to be formed into a target transmission frame into which one or more services are mapped, and each TAU carries a data fragment of the one or more services; N is a positive integer; and an overhead of each TAU comprises: an Identifier (ID) for indicating an identity of the target transmission frame, a length indicator for indicating the length of payload, occupied by the TAU, in an OBU, and a position indicator for indicating a position of the TAU in the target transmission frame;

a processing component, configured to execute following operations on the N OBUs one by one according to a sequence of receiving:

obtaining one or more TAUs from a current OBU sequentially through parsing according to the length indicator in the overhead of each TAU;

storing, one by one according to a sequence of parsing, each data fragment carried by the one or more TAUs, wherein if it is determined, according to the position indicator and the ID in the overhead of a certain TAU, that the TAU is the last TAU in the target transmission frame, it is determined that the one or more services in the target transmission frame have been completely received.

In the device, the processing component may be configured to:

designate a cache space according to the ID in the overhead of the one or more TAUs, and store, in the cache space, each data fragment carried by the one or more TAUs according to the sequence of parsing.

The solution of the embodiments of the present disclosure brings the following beneficial effect.

The solution of the embodiments of the present disclosure provides a method enabling service transmission in an OBTN. A length indicator for indicating the length of payload, occupied by a TAU, in an OBU is defined in the overhead of the TAU, so that a destination node can accurately parse a complete TAU from the OBU. In addition, since the mapping of service, the encapsulation of TAU and the sending of OBU at the source node, as well as the reception of OBU, the parsing of TAU and the service storage at the destination node are all executed in a sequence, the destination node can determine, according to the position indictor and the ID in the overhead of the TAU, whether the one or more services in the target transmission frame have been completely received.

DETAILED DESCRIPTION OF THE EMBODIMENTS

Detailed description will be provided hereinafter with reference to the accompanying drawings and specific embodiments so that the technical problem to be solved by the present disclosure, technical solution and advantages of the present disclosure are clearer.

Figure 1:
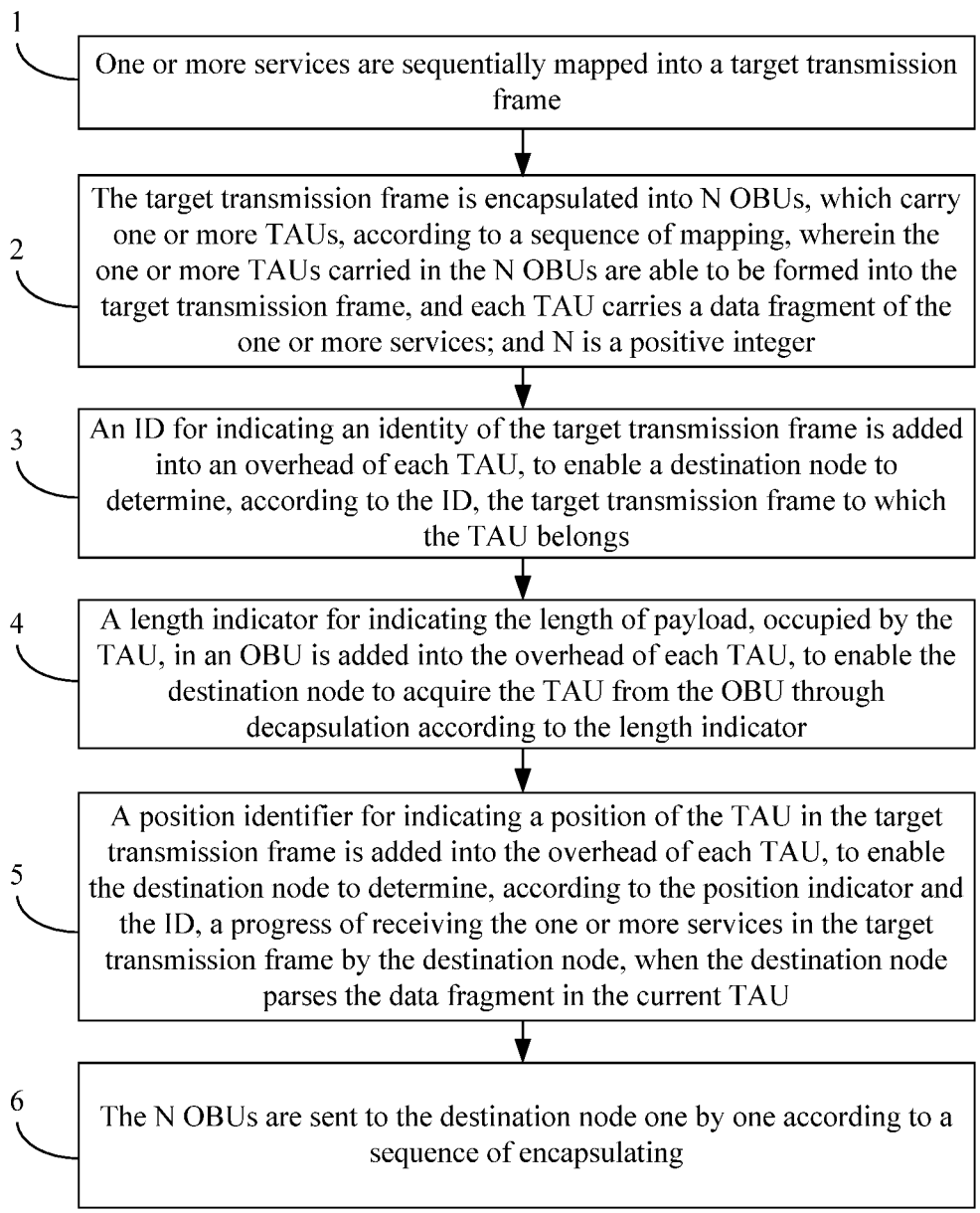
FIG. 1 is a schematic diagram showing the steps of a service sending method in an embodiment of the present disclosure.

As shown in FIG. 1, a service sending method includes the following steps.

Step 1: One or more services are sequentially mapped into a target transmission frame.

Step 2: The target transmission frame is encapsulated into N OBUs, which carry one or more TAUs, according to a sequence of mapping, wherein the one or more TAUs carried in the N OBUs are able to be formed into the target transmission frame, and each TAU carries a data fragment of the one or more services; and N is a positive integer.

Step 3: An Identifier ID for indicating an identity of the target transmission frame is added into an overhead of each TAU, to enable a destination node to determine, according to the ID, the target transmission frame to which the TAU belongs.

Step 4: A length indicator for indicating the length of payload, occupied by the TAU, in an OBU is added into the overhead of each TAU, to enable the destination node to acquire the TAU from the OBU through decapsulation according to the length indicator.

Step 5: A position identifier for indicating a position of the TAU in the target transmission frame is added into the overhead of each TAU, to enable the destination node to determine, according to the position indicator and the ID, a progress of receiving the one or more services in the target transmission frame by the destination node, when the destination node parses the data fragment in t.

Step 6: The N OBUs are sent to the destination node one by one according to a sequence of encapsulating.

The service sending method provided by the present embodiment adds a length indicator for indicating the length of payload, occupied by a TAU, in an OBU to the overhead of the TAU, so that the destination node can accurately parse a complete TAU from the OBU. In addition, since the mapping of service, the encapsulation of TAU and the sending of OBU at the source node are all executed in a sequence, if the reception of OBU, the parsing of TAU and the service storage are executed in a sequence similarly, whether the one or more services in the target transmission frame have been completely received can be determined according to the position indictor and the ID in the overhead of the TAU.

In an embodiment of the present disclosure, each OBU may carry one TAU in the target transmission frame, and Step 5 specifically includes that: when N>1, a first position indictor is added into overheads of the first N−1 TAUs, and a second position indictor is added into the overhead of the $N^{th}$ TAU; when N=1, the second position indicator is added into the overhead of the TAU, to enable the destination node to determine, according to the first position indictor and the ID, that there are one or more other TAUs to be parsed in the target transmission frame, and determine, according to the second position indictor and the ID, that all of the one or more TAUs in the target transmission frame have been parsed.

Figure 2:
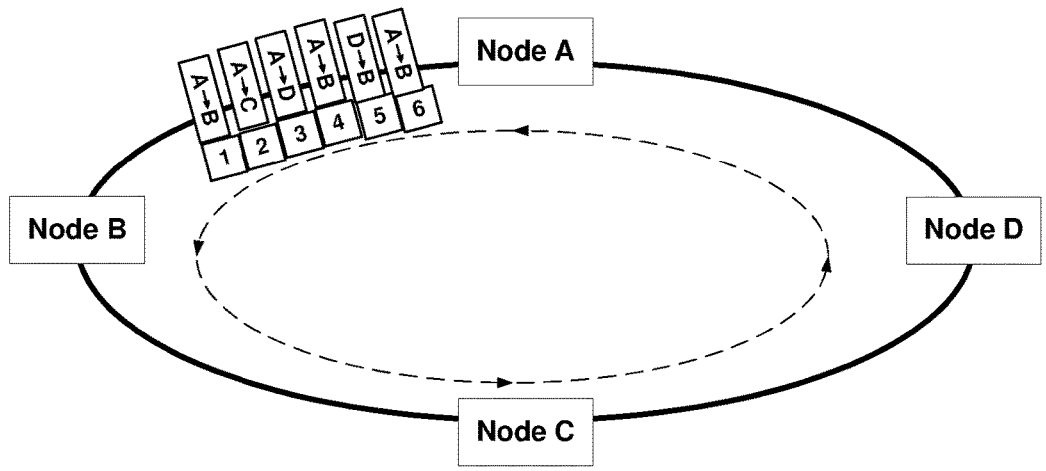
FIG. 2 is a schematic diagram showing the transmission of OBUs in a ring network in the embodiments of the present disclosure.

Since the aforementioned service/services is/are executed according to a sequence during the entire transmission process, it is only needed to distinctively identify the last TAU from other TAUs in the present embodiment, so as to determine whether all of the one or more TAUs in the target transmission frame have been parsed. It needs to be noted that although the N OBUs corresponding to the target transmission frame are sent to the destination node one by one according to the sequence of encapsulating, OBUs corresponding to some other transmission frames may be also sent in a practical transmission channel, thus resulting in a phenomenon as shown in FIG. 2. It can be seen from FIG. 2 that OBUs corresponding to different transmission frames are mixed with each other to form a transmission queue in a ring network that sends services in a counter-clockwise direction, a node B will receive OBUs (sequence numbers 1, 4 and 6 in FIG. 2) corresponding to a transmission frame from a node A, and may also receive one or more OBUs (sequence number 5 in FIG. 2) corresponding to a transmission frame from a node D. Therefore, the present embodiment also identifies a specific transmission frame to which a TAU in an OBU belongs according to an ID so as to determine the progress of receiving the service/services.

Figure 3:
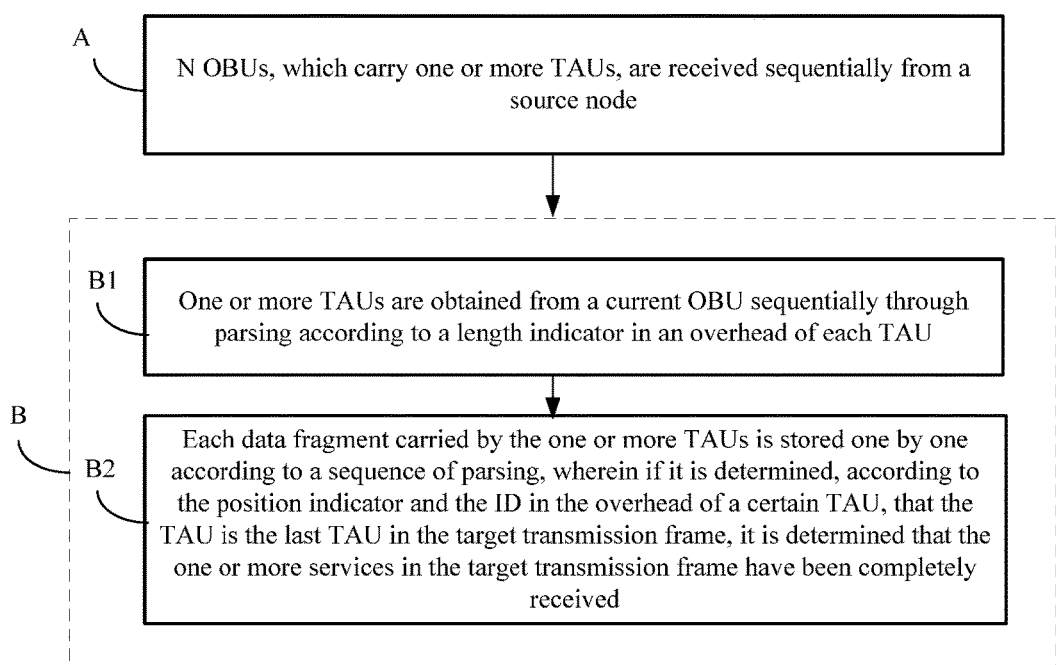
FIG. 3 is a schematic diagram showing the steps of a service receiving method in an embodiment of the present disclosure.

As shown in FIG. 3, an embodiment of the present disclosure further provides a service receiving method, including the following steps.

Step A: N OBUs which are sent from a source node and carry one or more TAUs are received sequentially, wherein the one or more TAUs carried in the N OBUs are able to be formed into a target transmission frame into which one or more services are mapped, and each TAU carries a data fragment of the one or more services; N is a positive integer; and an overhead of each TAU includes: an ID for indicating an identity of the target transmission frame, a length indicator for indicating the length of payload, occupied by the TAU, in an OBU, and a position indicator for indicating a position of the TAU in the target transmission frame.

Step B: The following operations are executed on the N OBUs one by one according to a sequence of receiving.

Step B1: one or more TAUs are obtained from a current OBU sequentially through parsing according to the length indicator in the overhead of each TAU.

Step B2: Each data fragment carried by the one or more TAUs is stored one by one according to a sequence of parsing, wherein if it is determined, according to the position indicator and the ID in the overhead of a certain TAU, that the TAU is the last TAU in the target transmission frame, it is determined that the one or more services in the target transmission frame have been completely received.

The present embodiment provides a service receiving method according to the service sending method above. A complete TAU can be parsed correctly from an OBU according to a length indicator in the overhead of the TAU. In addition, since the mapping of service, the encapsulation of TAU and the sending of OBU at the source node are all executed in a sequence, if the reception of OBU, the parsing of TAU and the service storage are executed in a sequence similarly, whether the one or more services in the target transmission frame have been completely received can be determined according to the position indictor and the ID in the overhead of the TAU.

In addition, in the embodiment of the present disclosure, Step B2 specifically includes that:

a cache space is designated according to the ID in the overhead of the one or more TAUs, and each data fragment carried by the one or more TAUs is stored in the cache space according to the sequence of parsing.

Similarly, as shown in FIG. 2, provided that a node B is the destination node as described herein, the node B of the present embodiment can separately store a service sent by a node A and a service sent by a node D, so that the service sent by the node A can be assembled in a dedicated cache space while the service sent by the node D can be assembled in another dedicated cache space, thereby avoiding mutual interference of the services from the two nodes when their respective data fragments are stored.

Specific implementation of a service sending method and a service receiving method in the embodiments of the present disclosure will be expounded below.

(1) A transmission frame into which a service is mapped is smaller than the payload length of an OBU.

Figure 4:
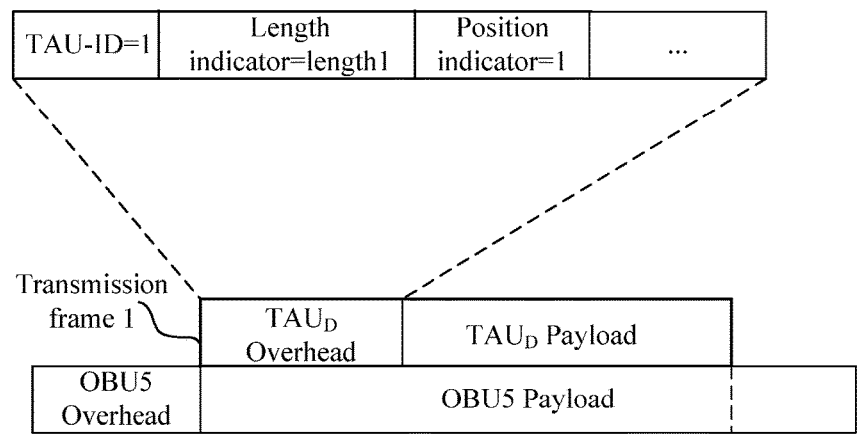
FIG. 4 and FIG. 5 are schematic diagrams showing the corresponding relation between TAU and OBU in the embodiments of the present disclosure.

Taking a four-node ring network as shown in FIG. 2 as an example (an application scenario of the embodiments of the present disclosure is not limited to the ring network), a client service 1 sent by a node D to a node B has been completely mapped to a transmission frame 1 during a certain operating period. It is provided that the client service 1 contains an extremely small amount of data, so that the length of the transmission frame 1 is smaller than the payload length of one OBU (i.e. the transmission frame consists of only one $TAU_D$ shorter than an OBU). The $TAU_D$ is encapsulated in an OBU5 as shown in FIG. 2, and as shown in FIG. 4, in the overhead of the $TAU_D$, an ID=1 is recorded to indicate the service transmission frame 1 corresponding to the $TAU_D$, a length indicator=length1 is recorded to indicate the length of an OBU5 payload occupied by the client service 1 in the $TAU_D$, and a position indicator=1 (i.e. the aforementioned second position indicator) is recorded to indicate that the $TAU_D$ is the last TAU of the transmission frame 1. Subsequently, the node D sends the OBU5 to the node B.

After receiving the OBU5, the node B obtains the overhead of the $TAU_D$ from the payload of the OBU5 through parsing, and then determines, according to the ID in the overhead, that the $TAU_D$ belongs to the transmission frame 1, and obtains the complete $TAU_D$ from the payload of the OBU5 through parsing according to the length indicator length1, and stores a data fragment (a complete client service 1) carried by the $TAU_D$ in a dedicated cache space 1 of the transmission frame 1, since the node B obtains the position indicator=1 from the overhead of the $TAU_D$, it can be determined that the client service 1 in the transmission frame 1 has been completely received.

It needs to be noted that other transmission frames into which services are mapped may also be encapsulated in the remaining payload of the OBU5 according to a method substantially the same as that in the present embodiment, which will not be described repeatedly here.

(2) A transmission frame into which a service is mapped is larger than the payload length of an OBU.

Figure 5:
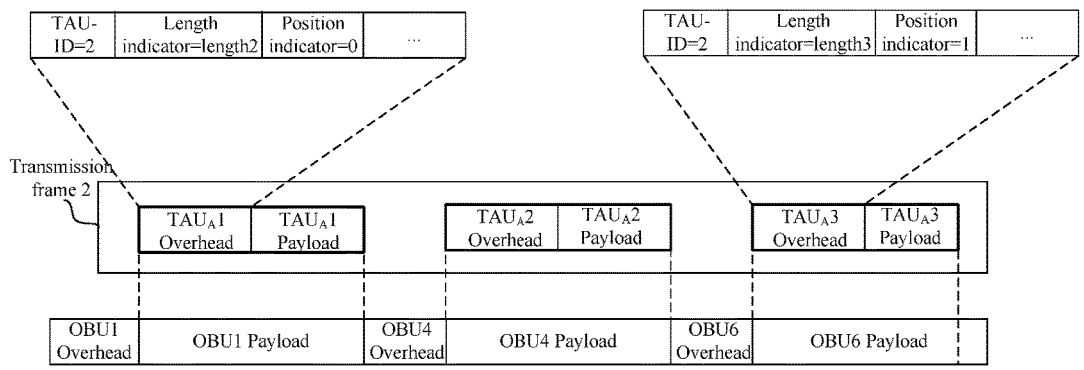

Similarly, taking a four-node ring network as shown in FIG. 2 as an example, a client service 2 sent by a node A to a node B has been completely mapped to a transmission frame 2 during a certain operating period. It is provided that the client service 2 contains an extremely large amount of data, so that the length of the transmission frame into which the client service 2 is mapped needs to be encapsulated in three OBUs (i.e. an OBU1, an OBU4 and an OBU6 hereinafter). As shown in FIG. 5, the transmission frame 2 is encapsulated into the OBUs sequentially. Firstly, the OBU1 carrying a $TAU_A1$ is obtained. In the overhead of the $TAU_A1$, an ID=2 is recorded to indicate that the $TAU_A1$ belongs to the service transmission frame 2, a length indicator=length2 is recorded to indicate the length (in the present case, the length2 should indicate that the payload of the OBU1 is fully occupied) of an OBU1 payload occupied by a data fragment of the client service 2 carried in the $TAU_A1$, and a position indicator=0 (the aforementioned first position indicator) is recorded to indicate that the $TAU_A1$ is not the last TAU of the transmission frame 2. In the same way, the OBU4 carrying an $TAU_A2$ and the OBU6 carrying a $TAU_A3$ are generated, wherein an overhead of the $TAU_A2$ is consistent with that of the $TAU_A1$; while an OBU4 payload occupied by a data fragment in the overhead of the $TAU_A3$ is length 3, and a position indicator=1. Subsequently, the node A sends the OBU1, OBU4 and OBU6 to the node B sequentially.

After receiving the OBU1, the node B obtains the overhead of the $TAU_A1$ through parsing from the payload of the OBU1, and then determines, according to the ID in the overhead of the $TAU_A1$, that the $TAU_A1$ belongs to the transmission frame 2, completely obtains the $TAU_A1$ from the payload of the OBU1 according to the length indicator length2, and subsequently stores the data fragment carried by the $TAU_A1$ in a dedicated cache space 2 of the transmission frame 2; since the node B obtains the position indicator=0 from the overhead of the $TAU_A1$, it can be determined that there are other TAUs to be parsed in the transmission frame 2. Subsequently, data fragments carried by the $TAU_A2$ and the $TAU_A3$ are stored in the cache space 2 one by one sequentially so that the data fragments in the cache space can be formed into a complete client service 2. After obtaining the position indicator=1 from the overhead of the $TAU_A3$, the node B can determine, after storing the data fragment of the $TAU_A3$, that the client service 2 of the transmission frame 2 has been completely received.

To sum up, the data transmission method of the present embodiment may be applied to an OBTN.

Figure 6:
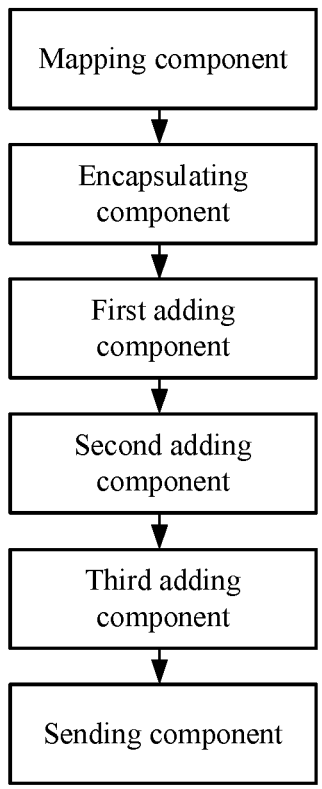
FIG. 6 is a structural diagram of a service sending device in an embodiment the present disclosure.

In addition, as shown in FIG. 6, the present disclosure further provides a service sending device, applied to a source node and including:

a mapping component, configured to sequentially map one or more services into a target transmission frame;

an encapsulating component, configured to encapsulate the target transmission frame into N OBUs according to a sequence of mapping to obtain N OBUs carrying TAUs, wherein the one or more TAUs carried in the N OBUs are able to be formed into the target transmission frame, and each TAU carries a data fragment of the one or more services; and N is a positive integer;

a first adding component, configured to add an ID for indicating an identity of the target transmission frame into an overhead of each TAU, to enable a destination node to determine, according to the ID, the target transmission frame to which the TAU belongs;

a second adding component, configured to add a length indicator for indicating the length of payload, occupied by the TAU, in an OBU into the overhead of each TAU, to enable the destination node to acquire the TAU from the OBU through decapsulation according to the length indicator;

a third adding component, configured to add a position indicator for indicating a position of the TAU in the target transmission frame into the overhead of each TAU, to enable the destination node to determine, according to the position indicator and the ID, a progress of receiving the one or more services in the target transmission frame by the destination node, when the destination node parses the data fragment in the current TAU; and a sending component, configured to send the N OBUs to the destination node one by one according to a sequence of encapsulating.

The service sending device provided by the embodiment adds a length indicator for indicating the length of payload, occupied by a TAU, in an OBU to the overhead of the TAU, so that the destination node can accurately parse a complete TAU from the OBU. In addition, since the mapping of service, the encapsulation of TAU and the sending of OBU at the source node are all executed in a sequence, if the reception of OBU, the parsing of TAU and the service storage are executed in a sequence similarly, whether the one or more services in the target transmission frame have been completely received can be determined according to the position indictor and the ID in the overhead of the TAU.

In an embodiment of the present disclosure, each OBU may only carry one TAU in the target transmission frame.

The third adding component may be configured to:

when N>1, add a first position indictor into overheads of the first N−1 TAUs, and add a second position indictor into the overhead of the $N_{th}$ TAU; when N=1, add the second position indicator into the overhead of the TAU, to enable the destination node to determine, according to the first position indicator and the ID, that there are one or more other TAUs to be parsed in the target transmission frame, and determine, according to the second position indictor and the ID, that all of the one or more TAUs in the target transmission frame have been parsed.

Apparently, the device of the present embodiment corresponds to a service sending method in the embodiments of the present disclosure, and the technical effect that can be implemented by the service sending method can be also implemented by the device of the present embodiment.

Figure 7:
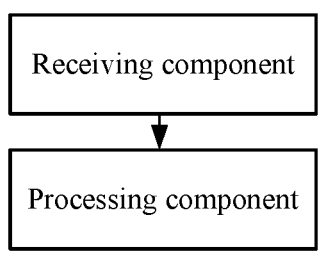
FIG. 7 is a structural diagram of a service receiving device in an embodiment of the present disclosure.

In addition, as shown in FIG. 7, an embodiment of the present disclosure further provides a service receiving device, applied to a destination node, and including:

a receiving component, configured to sequentially receive N OBUs which are sent from a source node and carry N TAUs, wherein the N TAUs are able to be formed into a target transmission frame into which one or more services are mapped, and each TAU carries a data fragment of the one or more services; N is a positive integer; and an overhead of each TAU includes: an ID for indicating an identity of the target transmission frame, a length indicator for indicating the length of payload, occupied by the TAU, in an OBU, and a position indicator for indicating a position of the TAU in the target transmission frame;

a processing component, configured to execute following operations on the N OBUs one by one according to a sequence of receiving:

one or more TAUs are obtained from a current OBU sequentially through parsing according to the length indicator in the overhead of each TAUs;

each data fragment carried by the one or more TAUs is stored one by one according to a sequence of parsing, wherein if it is determined, according to the position indicator and the ID in the overhead of a certain TAU, that the TAU is the last TAU in the target transmission frame, it is determined that the one or more services in the target transmission frame have been completely received.

The service receiving device of the present embodiment is able to parse a complete TAU correctly from an OBU according to a length indicator in the overhead of the TAU. In addition, since the mapping of service, the encapsulation of TAU and the sending of OBU at the source node are all executed in a sequence, if the reception of OBU, the parsing of TAU and the service storage are executed in a sequence similarly, whether the one or more services in the target transmission frame have been completely received can be determined according to the position indictor and the ID in the overhead of the TAU.

In the embodiment of the present disclosure, the processing component may be configured to:

designate a cache space according to the ID in the overhead of the one or more TAUs, and store, in the cache space, each data fragment carried by the one or more TAUs according to the sequence of parsing.

Apparently, the device of the present embodiment corresponds to a service receiving method in the embodiments of the present disclosure, and the technical effect that can be implemented by the service receiving method can be also implemented by the device of the present embodiment.

What are described above are example embodiments of the present disclosure. It should be pointed out that several improvements and modifications may be also made without departing from the principles of the present disclosure for those of ordinary skill in the art, and these improvements and modifications should be also regarded as the protection scope of the present disclosure.

INDUSTRIAL APPLICABILITY

As described above, a service sending method, a service receiving method, a service sending device and a service receiving device provided by the embodiments of the present disclosure have the following beneficial effect: a length indicator for indicating the length of payload, occupied by a TAU, in an OBU is defined in the overhead of the TAU so that a destination node can accurately parse a complete TAU from the OBU. In addition, since the mapping of service, the encapsulation of TAU and the sending of OBU at the source node, as well as the reception of OBU, the parsing of TAU and the service storage at the destination node are all executed in a sequence, the destination node can determine, according to the position indictor and the ID in the overhead of the TAU, whether the one or more services in the target transmission frame have been completely received.

What is claimed is:

1. A service sending method, applied to a source node and comprising:

sequentially mapping one or more services into a target transmission frame;

encapsulating the target transmission frame into N Optical Burst Units (OBUs), which carry one or more Transmission Adapter Units (TAUs), according to a sequence of mapping, wherein the one or more TAUs carried in the N OBUs are able to be formed into the target transmission frame, and each TAU carries a data fragment of the one or more services; N is a position integer;

adding an Identifier (ID) for indicating an identity of the target transmission frame into an overhead of each TAU, to enable a destination node to determine, according to the ID, the target transmission frame to which the TAU belongs;

adding a length indicator for indicating the length of payload, occupied by the TAU, in an OBU into the overhead of each TAU, to enable the destination node to acquire the TAU from the OBU through decapsulation according to the length indicator;

adding a position indicator for indicating a position of the TAU in the target transmission frame into the overhead of each TAU, to enable the destination node to determine, according to the position indicator and the ID, a progress of receiving the one or more services in the target transmission frame by the destination node, when the destination node parses the data fragment in the current TAU; and sending the N OBUs to the destination node one by one according to a sequence of encapsulating.

2. The method as claimed in claim 1, wherein each OBU carries one TAU in the target transmission frame;

adding one position indicator into the overhead of each TAU comprises:

when N>1, adding a first position indictor into overheads of the first N−1 TAUs, and adding a second position indictor into the overhead of the Nth TAU;

when N=1, adding the second position indicator into the overhead of the TAU, to enable the destination node to determine, according to the first position indicator and the ID, that there are one or more other TAUs to be parsed in the target transmission frame, and determine, according to the second position indicator and the ID, that all of the one or more TAUs in the target transmission frame have been parsed.

3. A service receiving method, applied to a destination node and comprising:

sequentially receiving, from a source node, N Optical Burst Units (OBUs), which carry one or more Transmission Adapter Units (TAUs), wherein the one or more TAUs carried in the N OBUs are able to be formed into a target transmission frame into which one or more services are mapped, and each TAU carries a data fragment of the one or more services; N is a positive integer; and an overhead of each TAU comprises: an Identifier (ID) for indicating an identity of the target transmission frame, a length indicator for indicating the length of payload, occupied by the TAU, in an OBU, and a position indicator for indicating a position of the TAU in the target transmission frame;

executing following operations on the N OBUs one by one according to a sequence of receiving:

obtaining one or more TAUs from a current OBU sequentially through parsing according to the length indicator in the overhead of each TAU;

storing, one by one according to a sequence of parsing, each data fragment carried by the one or more TAUs, wherein if it is determined, according to the position indicator and the ID in the overhead of a certain TAU, that the TAU is the last TAU in the target transmission frame, it is determined that the one or more services in the target transmission frame have been completely received.

4. The method as claimed in claim 3, wherein storing, one by one according to the sequence of parsing, each data fragment carried by the one or more TAUs comprises:

designating a cache space according to the ID in the overhead of the one or more TAUs, and storing, in the cache space, each data fragment carried by the one or more TAUs according to the sequence of parsing.

5. A service sending device, applied to a source node and comprising:

a mapping component, configured to sequentially map one or more services into a target transmission frame;

an encapsulating component, configured to encapsulate the target transmission frame into N Optical Burst Units (OBUs), which carry one or more Transmission Adapter Units (TAUs), according to a sequence of mapping, wherein the one or more TAUs carried in the N OBUs are able to be formed into the target transmission frame, and each TAU carries a data fragment of the one or more services; N is a positive integer;

a first adding component, configured to add an Identifier (ID) for indicating an identity of the target transmission frame into an overhead of each TAU, to enable a destination node to determine, according to the ID, the target transmission frame to which the TAU belongs;

a second adding component, configured to add a length indicator for indicating the length of payload, occupied by the TAU, in an OBU into the overhead of each TAU, to enable the destination node to acquire the TAU from the OBU through decapsulation according to the length indicator;

a third adding component, configured to add a position indicator for indicating a position of the TAU in the target transmission frame into the overhead of each TAU, to enable the destination node to determine, according to the position indicator and the ID, a progress of receiving the one or more services in the target transmission frame by the destination node, when the destination node parses the data fragment in the current TAU; and a sending component, configured to send the N OBUs to the destination node one by one according to a sequence of encapsulating.

6. The device as claimed in claim 5, wherein each OBU carries one TAU in the target transmission frame;

the third adding component is configured to:

when N>1, add a first position indictor into overheads of the first N−1 TAUs, and add a second position indictor into the overhead of the Nth TAU; when N=1, add the second position indicator into the overhead of the TAU, to enable the destination node to determine, according to the first position indicator and the ID, that there are one or more other TAUs to be parsed in the target transmission frame, and determine, according to the second position indicator and the ID, that all of the one or more TAUs in the target transmission frame have been parsed.

7. A service receiving device, applied to a destination node and comprising:

a receiving component, configured to sequentially receive, from a source node, N Optical Burst Units (OBUs), which carry N Transmission Adapter Units (TAUs), wherein the N TAUs carried in the N OBUs are able to be formed into a target transmission frame into which one or more services are mapped, and each TAU carries a data fragment of the one or more services; N is a positive integer; and an overhead of each TAU comprises: an Identifier (ID) for indicating an identity of the target transmission frame, a length indicator for indicating the length of payload, occupied by the TAU, in an OBU, and a position indicator for indicating a position of the TAU in the target transmission frame;

a processing component, configured to execute following operations on the N OBUs one by one according to a sequence of receiving:

obtaining one or more TAUs from a current OBU sequentially through parsing according to the length indicator in the overhead of each TAU;

storing, one by one according to sequence of parsing, each data fragment carried by the one or more TAUs, wherein if it is determined, according to the position indicator and the ID in the overhead of a certain TAU, that the TAU is the last TAU in the target transmission frame, it is determined that the one or more services in the target transmission frame have been completely received.

8. The device as claimed in claim 7, wherein the processing component is configured to:

designate a cache space according to the ID in the overhead of the one or more TAUs, and store, in the cache space, each data fragment carried by the one or more TAUs according to the sequence of parsing.

* * * * *